Sept. 16, 1958 P. A. O'NEILL 2,852,115
POWER DRIVE FOR ROTARY TOOLS
Filed March 2, 1953

PAUL A. O'NEILL,
INVENTOR.

BY John Flam
ATTORNEY.

United States Patent Office 2,852,115
Patented Sept. 16, 1958

2,852,115

POWER DRIVE FOR ROTARY TOOLS

Paul A. O'Neill, San Francisco, Calif., assignor to Union Machine Company, San Francisco, Calif., a corporation of California Application March 2, 1953, Serial No. 339,587

5 Claims. (Cl. 192—12)

This invention relates to a power drive for rotary tools, and particularly to a clutch or detachable coupling mechanism cooperable with a continuously driven source of rotary motion. Devices having this general function have been used, in which slipping of the clutch parts is effected whenever the torque required to operate the tool reaches a predetermined limit. Such a limit, for example, occurs when a screw or bolt is fully tightened, causing a great resistance to the turning of the screw driver or the wrench. By the aid of such slipping clutch devices, stalling loads on the motive power are prevented, as well as destructive rotary forces on the screw or bolt.

However, prior mechanisms of this character have been uniformly elaborate and correspondingly expensive. It is the primary object of this invention to provide a coupling device that performs the desired functions in a highly satisfactory manner, by the aid of a simple construction, utilizing but few parts, thereby minimizing costs and maintenance.

A simple two-part structure is provided, there being clutching surfaces carried by the parts and normally urged toward disengaging position. A sleeve manipulable to prevent rotation of the driven part upon disengagement for proper angular positioning of the tool with the work, is also provided. No rolling bearing elements are provided, the driving part being guidingly received by the driven part.

This invention possesses many other advantages, and has other objects which may be made more clearly apparent from a consideration of one embodiment of the invention. For this purpose, there is shown a form in the drawings accompanying and forming a part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
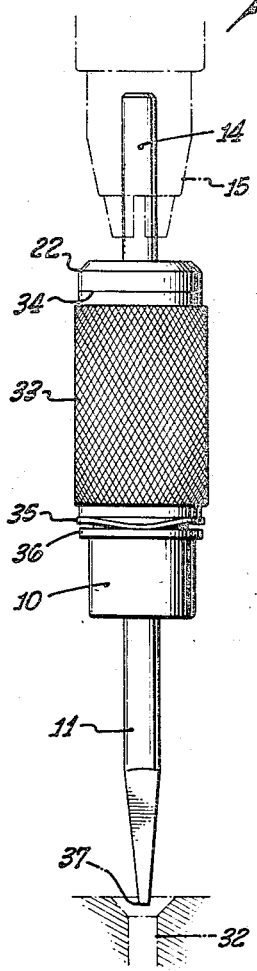
Figure 1 is an elevation of a coupling structure embodying the present invention, a portion of the rotary tool and the work being shown in phantom lines.
Figure 2:
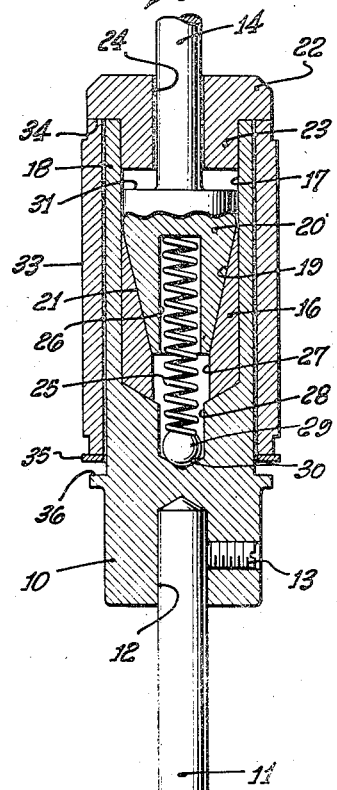
Fig. 2 is a view mostly in longitudinal section, illustrating the apparatus shown in Fig. 1.

A holder 10 carries a suitable rotary tool, such as a screw driver 11. The lowermost end of the holder 10 has a recess 12 in which the shank of the tool 11 may be received. A set screw 13, in appropriate engagement with the holder 10 and the tool 11, serves to couple the tool 11 to the holder 10 for rotation therewith.

A spindle 14, directly connected to a source of motion, is intended selectively to rotate the holder 10 and the tool 11. As shown in Fig. 1, the uppermost part of the spindle 14 is received in a chuck 15 of a rotating apparatus driven by power, such as a small electric motor. In this way a compact power driven hand tool is provided.

A driving connection is effected between the spindle 14 and the tool holder 10 by the aid of frusto-conical clutch elements carried by these respective parts. A brass annular seat member 16 is press-fitted in a cylindrical aperture 17 provided by an upwardly extending annular flange 18 of the holder 10.

This seat member 16 is provided with a concave frusto-conical surface 19. A head 20, integrally formed at the end of the spindle 14, is telescopingly, and thereby guidingly, received in the recess 17. This head 20 has a convex frusto-conical surface 21 corresponding in configuration to the seat surface 19 and adapted to mate therewith. Accordingly, when the spindle 14 and holder 10, together with the seat member 16, are moved toward each other to cause engagement between the surfaces 19 and 21, a friction driving connection is effected between the spindle 14 and the holder 10.

To limit the relative movement of the head 20 from the seat member 16, a cap 22 is provided. This cap has a reduced plug portion 23 which may be press-fitted into the end of the cylindrical recess 17. The cap 22 has a suitable through aperture 24 that permits, with clearance, the passage of that portion of the spindle 14 adjoining the head 20. The cap 22 may engage the rearwardly facing surface 31 of the head 20 upon separating movement of the head 20 from the seat 16.

Figure 3:
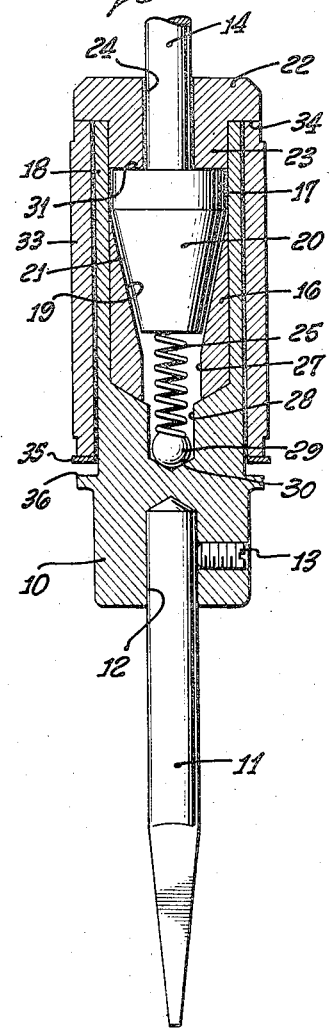
Fig. 3 is a view similar to Fig. 2, but showing the apparatus in uncoupling relationship.

For normally maintaining the holder and head 20 in uncoupling relationship, a helical spring 25 is provided. The upper portion of the spring 25 is received in, and abuts the bottom of, a cylindrical recess 26 in the lower end of the head 20. The spring 25 passes through an enlarged aperture 27 of the seat member 16 and into a restricted recess 28 in the holder 10 adjoining the bottom of the cylindrical recess 17. The spring 25 is seated on a ball 29 urged by the spring 25 into a tapered bottom 30 of the recess 28. Accordingly, unless a force is applied to overcome the resilient force of the spring 25, the head 20 will normally be urged to the position illustrated in Fig. 3, wherein the rear surface 31 of the head 20 engages the cap 22.

Since it is contemplated that the spindle 14 be continuously rotated, the frictional engagement between the head surface 31 and the cap 22 effects a rotatable connection between the spindle 14 and the holder 10, despite the fact that the surfaces 19 and 21 are out of engagement. In order definitely to stop the rotation of the tool 10 so that, for instance, the position of the tool 11 may be initially oriented with respect to a screw 32 (Fig. 1), a knurled sleeve 33 of substantial length is provided. This sleeve 33 is loosely telescopingly received about the flange 18 of the holder. The end of the flange 33 is resiliently urged into frictional engagement with a downwardly facing shoulder 34 of the cap 22 defined by the plug portion 23. Accordingly, appropriately grasping of the sleeve 33 by the operator to hold it against rotation, the frictional engagement between the sleeve and the cap 22 will be sufficient to overcome the frictional force of the rear surface 31 of the head on the cap 22.

For resiliently urging the sleeve 33 against the cap 22, a spring washer 35 is provided that engages both the lower end of the sleeve 33 and an integral peripheral flange 36 of the holder 10. The frictional engagement of the spring washer 35 with the lower end of the sleeve 33 of the flange 36 also effects a connection between the sleeve 33 and the holder 10 to prevent rotation of the holder.

The operation of the device may be as follows: In Fig. 1, the knurled periphery of the sleeve 33 may be grasped properly to position the head of the tool 11 in the slot 37 of the screw 32. A force may then be applied to move surface 21 formed on the head 20 of the spindle 14 into engagement with the tapered surface 19 of the seat member 16. Appropriate rotation is then thereby imparted to the tool 11. Slippage of the clutch parts 16 and 20 results from the reaction produced by the tightening of the screw, all in a well-known manner.

The loose sleeve 33 may be grasped at any time during operation, whether a coupling is effected or not, either to guide the tool, or to prevent rotation thereof upon disengagement of the clutching surfaces.

Figure 4:
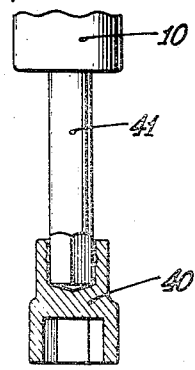
Fig. 4 is a fragmentary view, partly in section, showing another tool that may be used in conjunction with the apparatus.

In Fig. 4, a socket wrench 40 is shown carried on a stem 41 that may, in turn, be carried by the holder 10. The socket wrench 40 may be used for tightening bolts, or the like, in a manner entirely analogous to that set forth in connection with the tool 11.

The inventor claims:

1. In a device of the character described: a holder having a flange forming a cylindrical recess at one end; said holder having provisions for securing a tool; a driving member having a portion received in said recess; said holder having means limiting the relative movement of said holder and said member away from each other; means forming clutching surfaces on said holder and said member, and moved into driving engagement upon relative movement of said member away from said limiting means; a sleeve mounted about said flange for relative rotation with respect thereto; and resilient means interposed between the holder and one end of the sleeve for continuously urging the other end of the sleeve into engagement with said holder to effect a yielding rotatable coupling between the sleeve and the holder; the frictional torque drag exerted by the yielding rotatable coupling when the sleeve is restrained, exceeding the torque on said limiting means by the driving means for stopping rotation of said holder.

2. In a selective rotary coupling: a rotary driving member; a rotary driven member having provisions for securing a tool; means guiding said members for relative linear movement; said members having means operative to effect a rotatable coupling between the members upon relative movement of said members in one direction; a handle mounted on the driven member for relative rotation with respect thereto; and continuously operable means yieldingly rotatably coupling said handle to said driven member whereby said driven member is braked when the handle is restrained and when the members are uncoupled.

3. In a selective coupling: a tool holder having a cylindrical recess, and means forming a frusto-conical seat in said recess; a spindle having an enlarged head guidingly received by said recess, said head having a frusto-conical surface engageable with said frusto-conical seat upon movement of said head in one direction; a cap for said recess and limiting the relative movement of said head in the opposite direction; said cap having a peripheral flange; a tubular member mounted about said holder; and resilient means interposed between the holder and one end of the member for urging the other end of the member into engagement with said flange to effect a continuously operable yielding rotatable coupling between the member and the holder; the frictional torque drag exerted by the yielding rotatable coupling when the member is restrained, exceeding the torque exerted on said cap by said head for stopping rotation of said holder.

4. In a selective rotatable coupling: a tool holder having a cylindrical flange; a rotatable member guidingly received in said flange; means effecting a rotatable coupling between said holder and said member upon relative movement of said member and said holder toward each other; a cap for the end of said flange, and limiting relative movement of said rotatable member and said holder away from each other, said cap extending radially beyond said flange, and forming an abutment; means forming an abutment on said holder spaced from and opposed to said abutment of said cap; a sleeve rotatably mounted on said holder between said abutments; and means between one of said abutments and one end of said sleeve, resiliently and continuously urging the other end of said sleeve into frictional engagement with the other abutment and effecting a yielding rotatable coupling between said sleeve and said holder; the frictional torque drag exerted by the yielding rotatable coupling when the sleeve is restrained, exceeding the torque drag exerted on said cap by said rotatable member for stopping rotation of said holder.

5. In a friction power drive mechanism: a rotary tool holder having a recess; a driving member in the recess and adapted to be power rotated about an axis, the driving member being guided by the recess for axial movement between limits therein; means forming a frictional coupling between the driving member and the holder and operative upon relative movement of the driving member to one limited position in the recess; grip means mounted on said holder for relative rotation with respect thereto about said axis; and continuously operable means yieldingly rotatably coupling said grip means and said holder.

References Cited in the file of this patent

UNITED STATES PATENTS

| | | |
|---|---|---|
| 1,024,151 | Smith | Apr. 23, 1912 |
| 1,447,626 | Partlow | Mar. 6, 1923 |
| 1,777,829 | Edgecumbe | Oct. 7, 1930 |
| 1,879,546 | Seibert et al. | Sept. 27, 1932 |
| 2,501,386 | Gibbs | Mar. 21, 1950 |
| 2,756,854 | Brenholts | July 31, 1956 |

FOREIGN PATENTS

| | | |
|---|---|---|
| 521,447 | France | July 13, 1921 |